United States Patent
Moorthy et al.

(10) Patent No.: US 11,361,024 B2
(45) Date of Patent: Jun. 14, 2022

(54) ASSOCIATION MAPPING GAME

(71) Applicant: Ganalila, LLC, Pleasanton, CA (US)

(72) Inventors: Jaisree Moorthy, Dublin, CA (US); Shreedhar Natarajan, Dublin, CA (US)

(73) Assignee: GANALILA, LLC, Pleasanton, CA (US)

( * ) Notice: Subject to any disclaimer, the term of this patent is extended or adjusted under 35 U.S.C. 154(b) by 40 days.

(21) Appl. No.: 16/515,798

(22) Filed: Jul. 18, 2019

(65) Prior Publication Data

US 2020/0065331 A1 Feb. 27, 2020

Related U.S. Application Data

(63) Continuation of application No. 15/494,705, filed on Apr. 24, 2017, now Pat. No. 10,503,779, which is a (Continued)

(51) Int. Cl.
*A63F 13/63* (2014.01)
*A63F 13/332* (2014.01)
(Continued)

(52) U.S. Cl.
CPC ............ *G06F 16/84* (2019.01); *A63F 9/0612* (2013.01); *A63F 13/332* (2014.09); *A63F 13/46* (2014.09);
(Continued)

(58) Field of Classification Search
CPC ........ A63F 13/335; A63F 13/34; A63F 13/47; A63F 13/79; A63F 13/795
See application file for complete search history.

(56) References Cited

U.S. PATENT DOCUMENTS 5,004,244 A 4/1991 Johnson
5,767,854 A 6/1998 Anwar
(Continued)

FOREIGN PATENT DOCUMENTS

JP 2000305946 A 11/2000
JP 2005078633 A 3/2005
(Continued)

OTHER PUBLICATIONS

International Search Report and Written Opinion dated Aug. 5, 2014 corresponding to PCT/US2014/023059.
(Continued)

*Primary Examiner* — James S. McClellan
(74) *Attorney, Agent, or Firm* — DLA Piper LLP (US)

(57) ABSTRACT

Systems and methods for determining relationships between units are described. An illustrative system may include a semantic knowledge base having information regarding stored relationships between a plurality of units associated with content, a processor and a non-transitory, processor-readable storage medium in communication with the processor. The storage medium may include one or more programming instructions that, when executed, cause the processor to direct a display to present the plurality of units to one or more users, receive an input from each of the one or more users, compare the input with the information in the semantic knowledge base and determine whether the input corresponds to a stored relationship and provide a notification to each of the one or more users based upon the determining. The input may correspond to a determination of a relationship between the plurality of units based upon the content of each unit by a user.

52 Claims, 6 Drawing Sheets

Related U.S. Application Data continuation of application No. 14/394,573, filed as application No. PCT/US2013/037171 on Apr. 18, 2013, now Pat. No. 9,630,089.

(60) Provisional application No. 61/635,067, filed on Apr. 18, 2012.

(51) Int. Cl.

| | | |
|---|---|---|
| G06F 16/84 | (2019.01) | |
| G06F 16/28 | (2019.01) | |
| G06F 16/951 | (2019.01) | |
| G06Q 50/00 | (2012.01) | |
| A63F 13/847 | (2014.01) | |
| A63F 13/80 | (2014.01) | |
| A63F 13/46 | (2014.01) | |
| G06Q 50/10 | (2012.01) | |
| A63F 9/06 | (2006.01) | |
| G06F 9/451 | (2018.01) | |
| G06F 15/16 | (2006.01) | |
| G06N 5/04 | (2006.01) | |

(52) U.S. Cl.
CPC ............. *A63F 13/63* (2014.09); *A63F 13/80* (2014.09); *A63F 13/847* (2014.09); *G06F 9/451* (2018.02); *G06F 15/16* (2013.01); *G06F 16/284* (2019.01); *G06F 16/951* (2019.01); *G06N 5/04* (2013.01); *G06Q 50/01* (2013.01); *G06Q 50/10* (2013.01)

(56) References Cited

U.S. PATENT DOCUMENTS

| | | |
|---|---|---|
| 6,707,454 B1 | 3/2004 | Barg et al. |
| 7,711,689 B2 | 5/2010 | Kim |
| 10,503,779 B2 | 12/2019 | Moorthy et al. |
| 2001/0049695 A1 | 12/2001 | Chi et al. |
| 2002/0076678 A1* | 6/2002 | Westh .................. G09B 19/00 434/236 |
| 2003/0172075 A1* | 9/2003 | Reisman ............... G06F 16/951 |
| 2005/0093239 A1 | 5/2005 | Johnston |
| 2006/0020898 A1 | 1/2006 | Kim et al. |
| 2008/0046450 A1 | 2/2008 | Marshall |
| 2008/0162498 A1 | 7/2008 | Omoigui |
| 2009/0164945 A1 | 6/2009 | Li |
| 2009/0192954 A1 | 7/2009 | Katukur et al. |
| 2010/0064259 A1 | 3/2010 | Alexanderovitc et al. |
| 2010/0306708 A1 | 12/2010 | Trenz et al. |
| 2011/0049807 A1 | 3/2011 | Benty et al. |
| 2011/0320454 A1* | 12/2011 | Hill ....................... G06N 20/00 707/739 |
| 2011/0321097 A1 | 12/2011 | DaCosta |
| 2012/0047462 A1 | 2/2012 | Moon et al. |
| 2012/0302337 A1* | 11/2012 | Thakkar .............. G07F 17/3225 463/31 |
| 2012/0324374 A1 | 12/2012 | Karmon et al. |
| 2013/0097563 A1 | 4/2013 | Pacheco Rodrigues Velho et al. |
| 2015/0050973 A1 | 2/2015 | Moorthy et al. |
| 2016/0034115 A1 | 2/2016 | Natarajan et al. |

FOREIGN PATENT DOCUMENTS

| | | |
|---|---|---|
| JP | 2007066331 A | 3/2007 |
| JP | 2009294993 A | 12/2009 |
| JP | 2011008540 A | 1/2011 |
| JP | 2012247838 A | 12/2012 |
| JP | 2015523615 A | 8/2015 |
| WO | 2013158880 A2 | 10/2013 |
| WO | 2014164634 A1 | 10/2014 |

OTHER PUBLICATIONS

International Search Report dated Sep. 6, 2013 for corresponding International Application No. PCT/US2013/037171.

Kathrine, CatchAppNews—CatchAppNews, "[App Review]" Tracing hidden words to discover "Word Search Puzzle by Hangame", [online],Sep. 9, 2011, Créer, LLC [search Jan. 14, 2019], Internet <URL:http://catchapp.net/contents/story/355>.

\* cited by examiner

ASSOCIATION MAPPING GAME

CROSS-REFERENCE TO RELATED APPLICATIONS

This application claims the priority benefit of U.S. patent application Ser. No. 15/494,705, filed Apr. 24, 2017 entitled "Association Mapping Game," which claims the priority benefit of U.S. patent application Ser. No. 14/394,573, filed Oct. 15, 2014 entitled "Association Mapping Game," which is a U.S. national stage filing under 35 U.S.C. § 371 of International Application No. PCT/US2013/037171 filed Apr. 18, 2013 entitled "Association Mapping Game", which claims the benefit of priority to U.S. Provisional Patent Application No. 61/573,788, filed Apr. 18, 2012, and entitled "Association Mapping Game," the entire contents of each is hereby incorporated by reference.

BACKGROUND

Games, activities, exercises and the like that utilize forms of matching and/or association mapping are well known in the art for a multitude of uses. For example, matching exercises may be used as a developmental tool for children, as well as a medical diagnostic tool for diseases such as neurodegenerative disorders. These exercises and activities are generally used in the form of flash cards, board games, computer programs and the like, and may further be geared for use by a single person or to allow several people to interact with each other through the exercises.

With the advent of social networking, a large shift has occurred in playing games, activities, exercises and the like from several users in a single area to several users in all parts of the world. For example, a traditional board game may require its participants to all be located in the same general area, such as the same room, in order for the game to be properly played. With a social networking interface, this is no longer a requirement, as participants can all log into the game over the internet via an application ("app"), an interface, a workstation and the like from all over the world to join in on a virtual version of the traditional game.

However, there still exists a need for novel systems and methods for games, activities, exercises and the like that utilize forms of matching and/or association mapping, particularly in a social networking environment.

SUMMARY

In an embodiment, a system may include a semantic knowledge base having information regarding one or more stored relationships between a plurality of units associated with content, a processor and a non-transitory, processor-readable storage medium in communication with the processor. The non-transitory, processor-readable storage medium may include one or more programming instructions that, when executed, cause the processor to direct a display to present the plurality of units to one or more users and receive an input from each of the one or more users. The input may correspond to a determination of a relationship between the plurality of units based upon the content of each unit by a user. The non-transitory, processor-readable storage medium may also include one or more programming instructions that, when executed, cause the processor to compare the input with the information in the semantic knowledge base, determine whether the input corresponds to a stored relationship and provide a notification to each of the one or more users based upon the determining. The notification may include an indication that the input corresponds to a stored relationship or an indication that the input does not correspond to a stored relationship.

In an embodiment, a method of determining one or more relationships between a plurality of units may include presenting, by a processor, the plurality of units to one or more users. For each of the one or more users, the method may also include receiving, by the processor, an input from the user. The input may correspond to a determination of a relationship between a plurality of units based upon a content of each unit by the user. For each of the one or more users, the method may also include comparing, by the processor, the input with the information in a semantic knowledge base and determining, by the processor, whether the input corresponds to a stored relationship stored in the semantic knowledge base.

In an embodiment, a system for determining relationships between mined data through the use of crowd sourced games may include a semantic knowledge base having information regarding one or more stored relationships between a plurality of units associated with content having the mined data, a processor and a non-transitory, processor-readable storage medium in communication with the processor. The non-transitory, processor-readable storage medium may include one or more programming instructions that, when executed, cause the processor to present the plurality of units to one or more users and receive an input from each of the one or more users. The input may correspond to a determination of a relationship between a plurality of units based upon the content of each unit by a user. The non-transitory, processor-readable storage medium may further include one or more programming instructions that, when executed, cause the processor to compare the input with the information in the semantic knowledge base, determine whether the input corresponds to a stored relationship and, present a voting request that includes the input to each of the one or more users in response to the input not corresponding to a stored relationship. The non-transitory, processor-readable storage medium may further include one or more programming instructions that, when executed, cause the processor to receive, from each of the one or more users, a voting response. The voting response may confirm that the input contains a valid relationship or may deny that the input contains a valid relationship. The non-transitory, processor-readable storage medium may further include one or more programming instructions that, when executed, cause the processor to determine a number of confirmed voting responses and a number of denied voting responses and, update the semantic knowledge base with new information regarding the relationship between the plurality of units from the input in response to the number of confirmed voting responses being greater than the number of denied voting responses.

DETAILED DESCRIPTION

Figure 1:
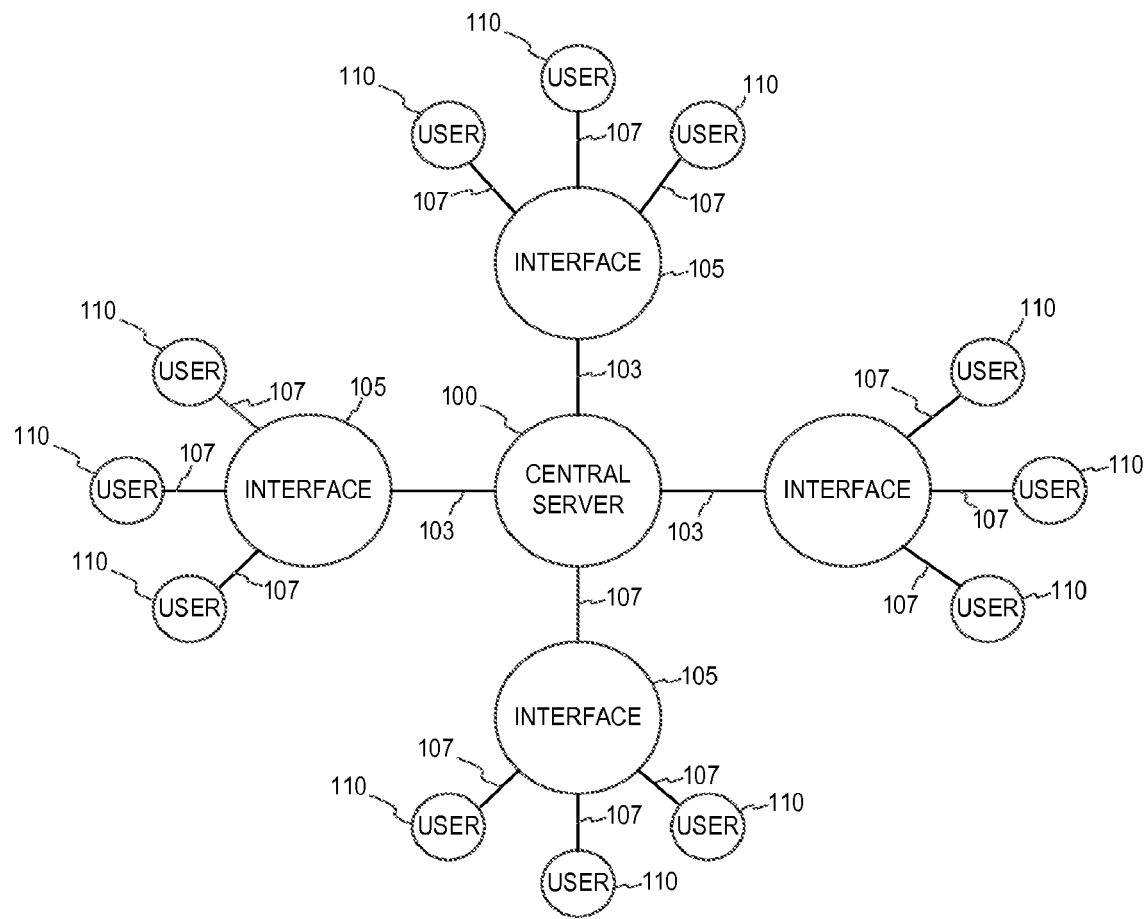
FIG. 1 depicts a server and user interface schematic in accordance with an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

An "electronic device" refers to a device that includes a processor, tangible, computer-readable memory and a display. The memory can contain programming instructions that, when executed by the processor, cause the device to perform one or more operations according to the programming instructions. Examples of electronic devices are not limited by this disclosure and may include, but are not limited to, personal computers, gaming systems, televisions, and portable electronic devices such as smartphones, personal digital assistants, cameras, tablet computers, laptop computers, GPS navigation devices, media players, medical devices and the like.

A "computing device" refers to a computer, a processor, a memory and/or any other component, device or system that performs one or more operations according to one or more programming instructions.

A "knowledge base" refers to a repository of searchable data. A knowledge base can include a software component, such as, but not limited to, a database and/or a table. Alternatively, a knowledge base may include a hardware component, such as, but not limited to, a tangible storage medium. As discussed below, a "semantic knowledge base" is a specific embodiment of a knowledge base. A semantic knowledge base includes data in the form of an ontology.

A "semantic reasoner" refers to a system including one or more computing devices in operable communication with a semantic knowledge base.

A "gameplay screen" refers to a specific area, either on the display of an electronic device, a section of the board in a board game or the like, where the various components of the game are designated as "in play". Other areas, such as an area for a user to view and/or sort his/her tiles, menu screens, boot screens and the like are not part of the gameplay screen.

A "game" refers to a board game, an electronic game, a gesture-based game and/or the like, and may further include activities and exercises. While the present disclosure generally relates to games for entertainment, those skilled in the art may recognize that the scope of the present disclosure may additionally relate to learning and development exercises, medical diagnosis exercises, feedback gathering exercises, proof of human input systems, exercises for assessment and evaluation, interactive advertising, newsfeed gathering and the like. Furthermore, the data collected from activities presented herein may further be used for purposes such as data mining and information retrieval, analytic gathering for advertising content customization and/or recommendations systems.

"Correspond" or "corresponding" refers to an association between a plurality of contents. Thus, content that conforms with, is consistent with, or is in agreement with additional content may be identified as "corresponding" to that additional content. Associations may include, but are not limited to, supportive associations, associative associations, corresponding associations, antagonistic associations, successive associations, partnership associations or meta associations. Associations between contents may be weighted based upon a number of factors, such as closeness of association or importance of association. In some embodiments, the associations may be weighted by the system described herein. In other embodiments, the associations may be weighted by one or more of the users, as described herein. Associations may be pre-defined, user defined, crowd-sourced and/or the like, and may further be enhanced, diminished, turned on or turned off by gameplay options.

The present disclosure pertains to methods and systems for presenting an activity interface to one or more users that utilizes a matching and/or an association mapping engine.

In an embodiment, as shown in FIG. 1, a central server 100 may generally connect to one or more interfaces 105 via one or more communication ports 103. The central server 100 may be a computing device, such as the illustrative computing device described in FIG. 6, that comprises a memory. The memory may contain programming instructions that direct other components of the computing device to communicate with the interfaces 105, process data, and/or complete other tasks. The central server 100 may further have a database that contains information such as, but not limited to, user data, activity data, game data and/or the like.

The one or more interfaces 105 may also be one or more of the following: computing devices, electronic devices and/or the like that generally contain programming instructions for interacting with the central server 100 and one or more users 110. The programming instructions may comprise programming for a game, activity, exercise and the like, such as an application that can be downloaded to an electronic device such as a smartphone, tablet or personal computer. In addition to having an ability to interact with one or more users 110, the interfaces 105 may further enable the users 110 to interact with each other, including users that are interacting with the same interface and users that are interacting with different interfaces.

The communication ports 103 that connect the central server 100 to the interfaces 105 may utilize any method of communication via a network, including but not limited to a wide area network (WAN), a local area network (LAN), a personal area network (PAN), a virtual private network (VPN), the internet and the like. Connections 103 may further be wired or wireless, and may utilize social networking platforms to connect users 110 to each other.

Figure 2:
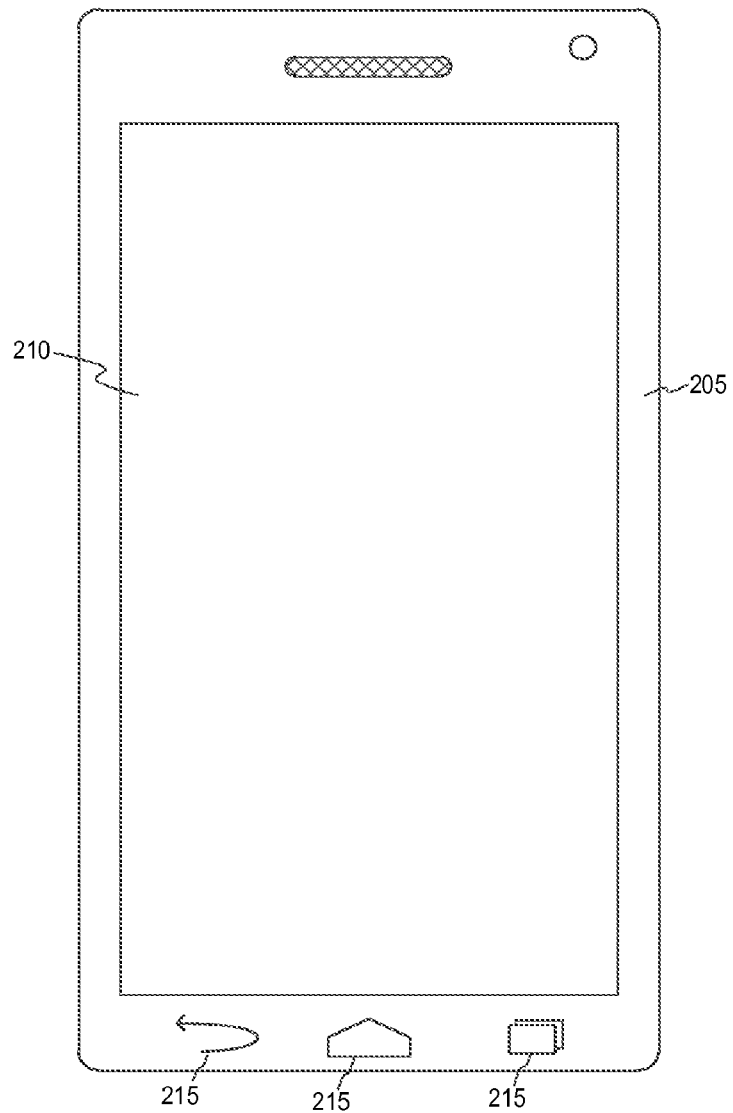
FIG. 2 depicts an electronic device as a user interface in accordance with an embodiment.

In an embodiment, the interface 110 (FIG. 1) may be an electronic device 205, as shown in FIG. 2. The electronic device 205 may have, among other components, a display 210.

The display 210 may generally be used to display images, text, video, and the like. The display 210 may further be adapted to display the images, text, video and the like according to commands received from the processor. Examples of displays may include, but are not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays.

The display 210 may further include a touch sensitive screen, wherein the touch sensitive screen may act as a user interface device. The touch sensitive screen may receive contact-based inputs from a user, such as from a user's fingers or a stylus. The touch sensitive screen may be adapted for gesture control, thus allowing for a user to tap, pinch, swipe, or provide other similar gestures to elicit commands to the electronic device 205. The touch sensitive screen may further be capable of sending signals to the processor based upon elements displayed on the display 210 and the location and type of gesture used. Examples of touch sensitive screens may include, but are not limited to, resistive touchscreens, capacitive touchscreens, infrared touchscreens and/or other technologies now known or later developed. Alternatively, or in addition to a touch sensitive screen, the electronic device may include one or more buttons, keys, or switches 215, which optionally may be part of a keyboard or keypad, to serve as a user input interface.

Figure 3A:
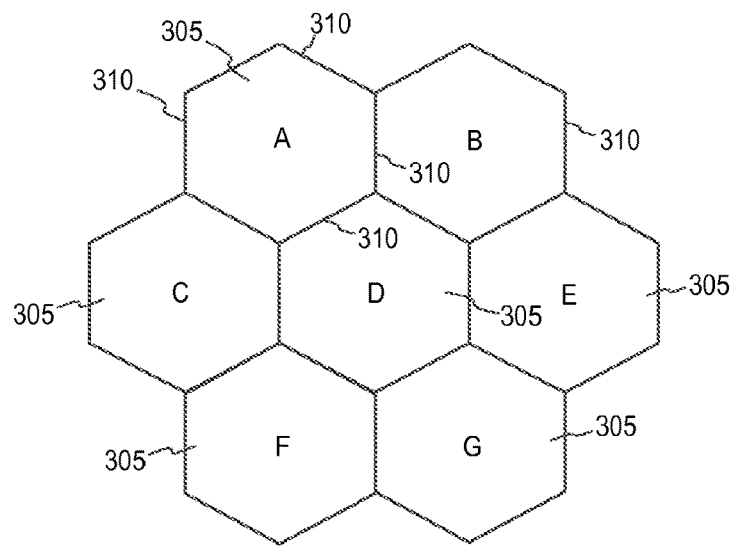
FIG. 3A depicts an illustrative tile shape and adjacent positioning arrangement in accordance with an embodiment.
Figure 3B:
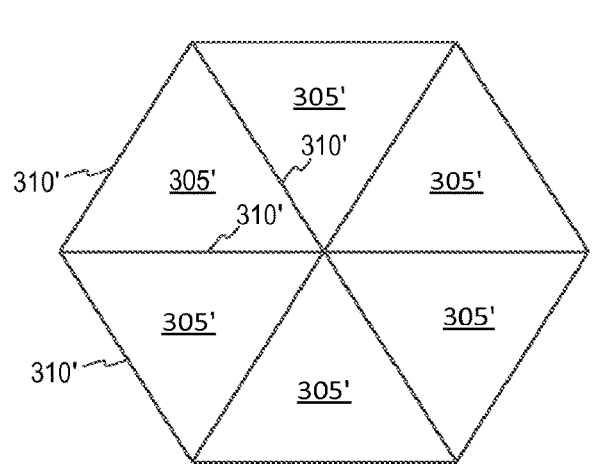
FIG. 3B depicts an illustrative tile shape and adjacent positioning arrangement in accordance with another embodiment.
Figure 3C:
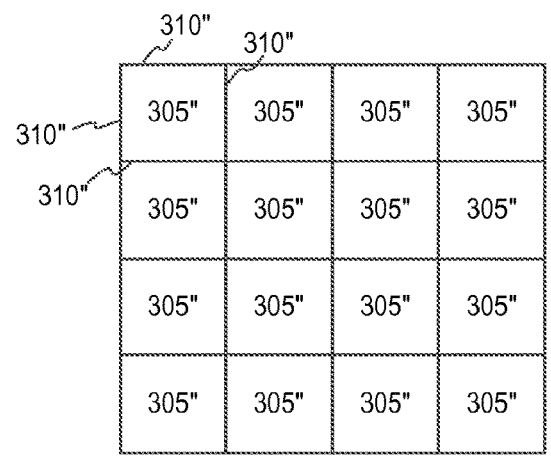
FIG. 3C depicts an illustrative tile shape and adjacent positioning arrangement in accordance with yet another embodiment.

As described herein, the electronic device 205 may have a memory containing programming instructions. The programming instructions may generally contain instructions that direct the device and/or components thereof to interact with a user. The instructions may further direct the electronic device 205 to display an image on the display 210, such as a plurality of tiles 305, as shown in FIGS. 3A-C. The tiles 305 may generally be of any two dimensional or three dimensional shape, such as a polygon, a circle, a block or the like. Some examples of shapes for the tiles 305 may include, but are not limited to, hexagons (FIG. 3A), triangles (FIG. 3B), or squares (FIG. 3C). The tiles 305 may have an identical shape and size, or may have varying shapes and sizes. Additionally, shape and size of tiles may be adjustable by a user. Tiles 305 may vary in color, and the various colors of tiles may correspond to varying types of tiles, varying functions and/or the like. While the term "tile" is used herein, those skilled in the art will recognize that any type of unit capable of performing the functions of the tile 305 and containing content as described herein may be used. Thus, the term "tile" is used herein for illustrative purposes only.

The tiles 305 may be readily modifiable by a user, and may have an ability to be moved, repositioned, clicked, touched and/or the like. The modifications to a tile may result in the tile performing a function, sending a signal, altering its state and/or the like.

The tiles 305 may be arranged in a manner so that each edge 310 of each tile 305 comes in contact with an edge 310 of an adjacent tile 305. The tiles 305 may be arranged in a two dimensional manner as shown in FIGS. 3A-C, may be arranged in a three dimensional manner or may be layered over top each other.

The tiles 305 may further be arranged in such a manner so that corresponding tiles (as defined herein) are positioned adjacent to each other, such as tiles A and D in FIG. 3A. Thus, a tile 305 may only have an edge 310 that is adjacent to the edge 310 of another tile 305 when the two tiles correspond to each other. Accordingly, tiles that do not directly correspond to each other tile may not have adjacent edges, such as tiles C and G in FIG. 3A. Tiles 305 may be arranged in a regular fashion (i.e., each edge of a tile is identical in length to an edge of a corresponding tile, and the two edges are perfectly aligned) or may be arranged in an irregular fashion (i.e., edges of tiles may or may not be identical in length, and the edge of a tile may be aligned with an edge of one or more corresponding tiles).

In some embodiments, a user may determine whether the tiles 305 correspond to each other. In such embodiments, the user may determine a weight of the association between tiles 305. Thus, for example, a user may determine that certain corresponding tiles 305 may be more closely associated than other corresponding tiles and may give additional weight to the association of the tiles that more closely correspond. In some embodiments, a user may provide many associations between tiles 305 by providing an association map and/or a subset thereof. In other embodiments, the system may determine whether the tiles 305 correspond to each other. Similar to the user described above, in these embodiments, the system may also determine a weight of the association between tiles 305.

The tiles 305 may be organized and/or indexed with coordinate locations to aid in efficient tile location, particularly in instances described herein where large numbers of tiles are used. Examples of coordinate locations may include, but are not limited to, grid formation, row/column numbering and/or the like.

Figure 4A:
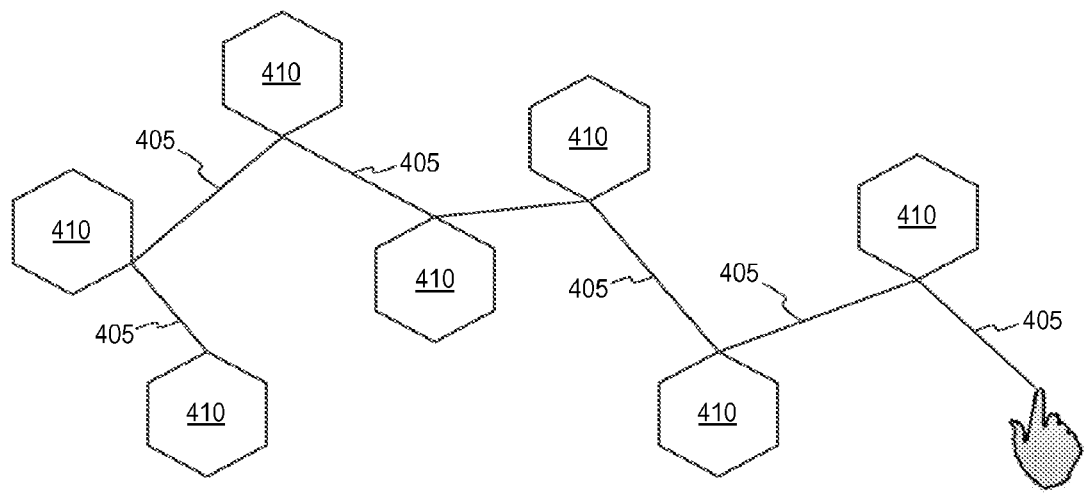
FIG. 4A depicts an illustrative tile shape and line connection arrangement in accordance with an embodiment.
Figure 4B:
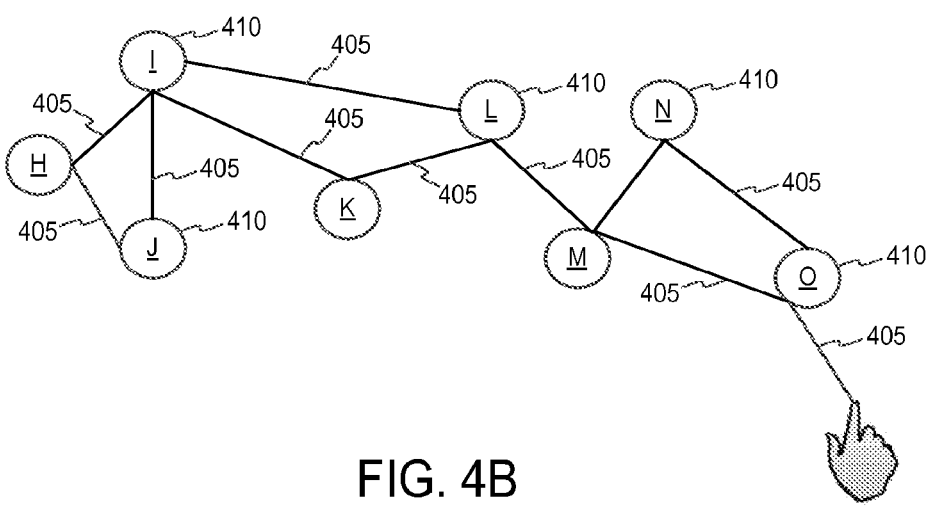
FIG. 4B depicts an illustrative tile shape and line connection arrangement in accordance with another embodiment.

In an alternative embodiment, as shown in FIGS. 4A and 4B, tiles that correspond to each other may be connected via trace lines 405 instead of having adjacent edges. The trace lines 405 may connect a first corresponding tile 410 to a second corresponding tile 410. A trace line 405 may only connect two corresponding tiles 410 together. Thus, a tile 410 that directly corresponds to multiple other tiles, such as tile I in FIG. 4B, may have multiple trace lines 405 connecting it to the other corresponding tiles (tiles H, J, K and L).

Each tile presented in FIGS. 3A-C and 4A-B may generally be associated with content. The content may be superimposed over the associated tile so that both the tile and the content are viewable, as well as the contents of other tiles. Alternatively, the content may be accessible from a menu, such as a menu that appears when a user clicks, taps, or presses a tile. The content may be any type of content, including but not limited to, images, photographs, words, phrases, sentences, animations (i.e., multiple images displayed in rapid succession), numbers, audio clips, video clips, nested games, exercises or activities and advertisements, as well as combinations thereof. The content may be involved with drilldown and/or roll-up operations, wherein the overall gameplay activity of all tiles requires the completion of activities within individual tiles. The content may be transferred between tiles, such as by a drag and drop operation, and further may be hidden or displayed via user interaction. In some embodiments, the content may be indexable and/or searchable, such as by the system or a user. In some embodiments, the content may be indexable and/or searchable for the purpose of filtering and/or selectively choosing content. For example, a user may have a preference to only receive a subset of tiles that relate to a certain category of content. The user may request that the system only provide the user with content associated with the certain category, which may be ascertained by, for example, searching and/or indexing the content, as described herein.

The content may be created in real-time as the gameplay proceeds, and may be stored in a semantic knowledge base on the central server 100 (FIG. 1), stored in a semantic knowledge base on each interface 105 (FIG. 1), or stored on an external source, such as devices connected to the internet for future access.

Alternatively, or in addition, the content may be preprogrammed and stored in a semantic knowledge base on the central server 100 (FIG. 1), stored in a semantic knowledge base on each interface 105 (FIG. 1), or stored on an external source, such as a device connected to the internet, prior to being displayed on the tiles. Content that is pre-programmed may be offered to a user gratis, may require the user to purchase content for use or may require the user to redeem coupons and/or virtual currency to obtain content.

The content may be derived from one or more individual users, and stored as data in the semantic knowledge base on the central server 100 (FIG. 1) or stored in the semantic knowledge base on each interface 105 (FIG. 1) for future access by other users. Users may create content using any method now known or later developed, including, but not limited to, downloading content from the internet, creating content by means of typing numbers, letters, phrases, sentences and the like, recording video clips and/or audio clips, taking photos or completing an exercise or task.

Content, when stored in the semantic knowledge base on the central server 100 (FIG. 1) or stored the semantic knowledge base on each interface 105 (FIG. 1), may further contain information relating to said content. The information may include keywords, key phrases, or other types of identifiers that may allow a semantic reasoner to recognize the content and/or match the content to corresponding content, as described in more detail herein.

Content may be classified by type, and may further be classified as premium content, bonus content and/or the like in instances where the content may be provided with the sale of goods, provided as an advertisement, provided as a promotional item and/or the like. Premium content may contain additional items such as coupons, codes, rewards and/or the like.

The content may further be purchased, sold, gifted or traded between users and/or content providers. Additional tiles 305 (FIG. 3) may also be purchased, sold, gifted or traded between users, content providers and the like to store content when no tiles are available. Optionally, content and tiles may be purchased, sold, gifted or traded in conjunction with each other.

In instances where the tiles are three dimensional in shape, each tile may have a plurality of faces. Each of the plurality of faces may behave as an individual two dimensional tile, and each of the plurality of faces may be associated with content. The content on each of the plurality of faces may correspond to the content on other faces, or may be different content.

Each tile 305 (FIG. 3) may additionally be associated with one or more tags. Tags may generally contain additional information about the tile, such as associated keywords or the like. Tags may be integrated with the content of each tile, or may alternatively be separate from the content. Tags may be predefined and/or user defined.

Figure 5:
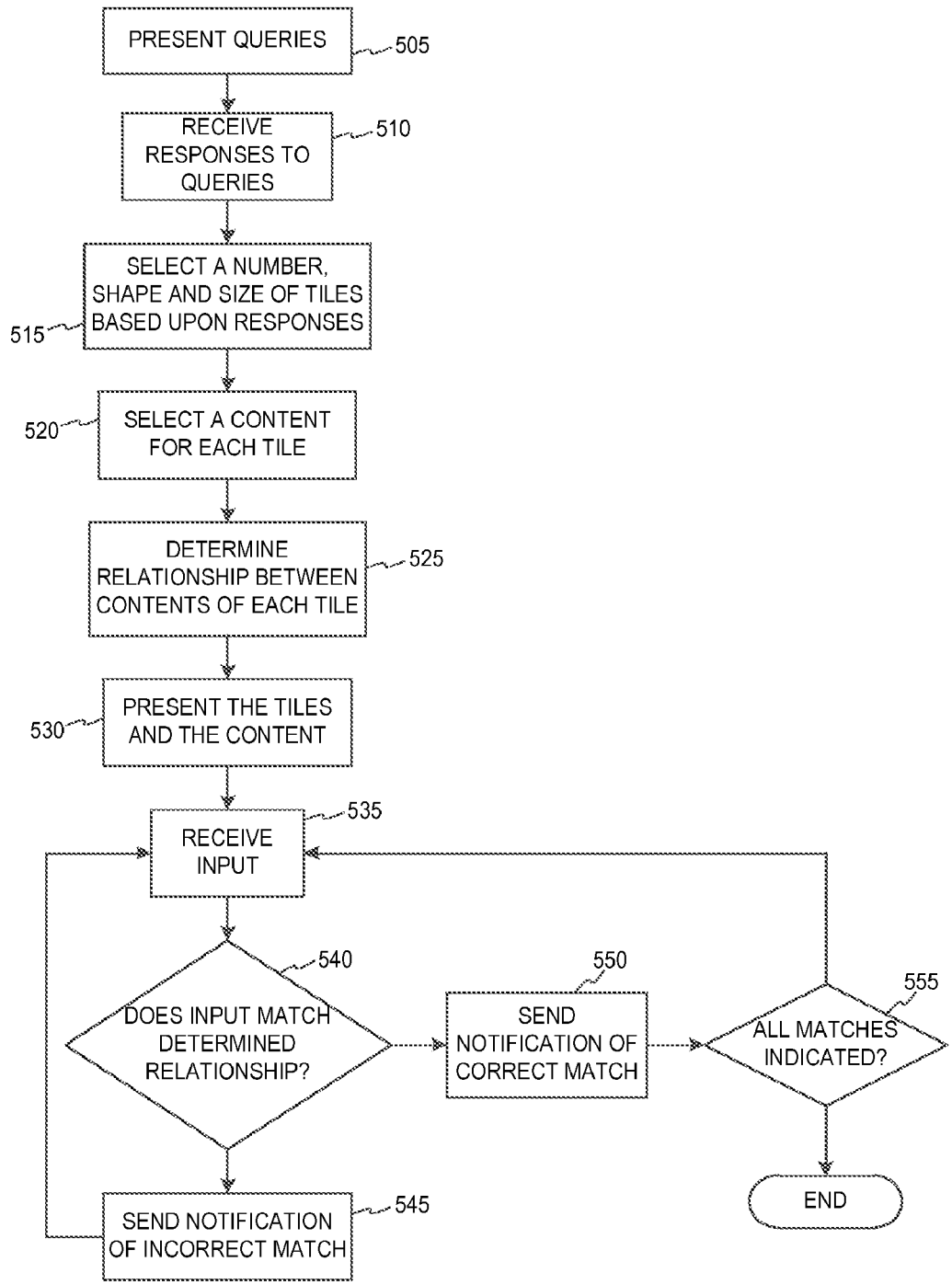
FIG. 5 depicts a flow chart diagram of a process in accordance with an embodiment.

As described herein, the central server 100 (FIG. 1) and/or each interface 105 may have a memory. The memory may further contain programming instructions that may direct a processor and/or other components to carry out a series of commands. FIG. 5 depicts an embodiment of the series of commands. In various embodiments, the system may present 505 a user or multiple users with one or more queries that may generally be used to set the gameplay settings and customize the desired user interface for each user. Examples of such queries may include, but are not limited to, querying the number of users and/or providing a unique game identifier for additional users to sign in to a game, querying whether computer players/artificial intelligence players are desired, querying the user on the shape and number of tiles desired, a maximum and/or a minimum number of relationships between tiles, whether a two-dimensional or a three-dimensional game is desired, desired topic areas, desired content to be displayed on the tiles, whether content on the tiles can be modified and/or quantified, color settings, text font and size, whether audible, visual or haptic feedback is desired, whether background music is desired and/or the like. In some embodiments, the system may provide a "randomly select" option to the user, whereby when selected, the system automatically randomizes and selects responses to each of the queries.

In instances when multiple users are participating in the same game, the system may allow for individual customizations in the form of color settings, text font, text size, audible feedback, visual feedback, haptic feedback, background music and/or the like on one or more of the interfaces 100 (FIG. 1). In some embodiments, the shape, size, number, relationship, content and the like of the tiles is customized per game and thus each individual user may not be able to set his/her own desired settings for those features. In these embodiments, the system may designate a single user, such as the first user to start the new game before others join in, as the user to respond to the queries. In other embodiments, the system may present all users with the same query and automatically update the settings across a plurality of the interfaces 100 (FIG. 1) whenever a user changes those settings. In other embodiments, each user may customize all features, regardless of how another user chooses his/her customization, so as to facilitate crowd-sourced connections and content.

In various embodiments, the system may provide a user with an option to save his/her responses to the queries for future use. In some embodiments, if a user selects the option to save, the system may automatically store the responses to a file and/or database in the memory for future retrieval. When a user selects the option to save his/her responses, the system may, upon subsequent uses, bypass the querying step. In other embodiments, during subsequent uses, the system may present the querying step with the saved responses to the queries pre-selected, and ask the user if he/she desires to change any of the pre-selected responses.

In some embodiments, the system may also provide a user with queries and/or options to save his/her profile information, which may contain biographical information, user names, passwords, associated accounts, preferred gameplays, favorite tiles/contents and/or the like.

All of the queries presented to the user(s) may be optional, and thus if a user desires not to respond to the queries to customize the gameplay and user interface, the system may automatically input any number of default responses to each of the queries.

Once inputs or lack thereof are received 510 from the user in response to the queries, the system may customize 515 the interface to match the user's requests and/or the default settings. The customization may include, but is not limited to, creating the number, shapes, and sizes of the tiles to be used, setting other customizations for each user and the like. The system may select 520 a content for each of the tiles to be used, and may parse, by use of the semantic reasoner, the semantic knowledge base to determine 525 the relationships between the contents of each tile.

In various embodiments, the system may begin the gameplay by presenting 530 one or more tiles that optionally contain content to the user(s). Presentment of the tiles to the user(s) may be done in any number of manners, including, but not limited to, one at a time, all at once or in groups of tiles. The content displayed on the tiles may be visible to the user upon presentment, or may require a user input, such as a click, to view the contents of each tile.

In instances of a game where multiple users are participating, the system may present all of the tiles to each of the user, may designate a number of unique tiles to each user or any combination thereof. For example, in a game where 5 users are playing and 100 tiles are available, the system may give the same 100 tiles to each user, may divide the tiles into five groups of 20 and present each user with one of the five groups or may provide each user with 25 tiles, wherein each user is presented with a number of tiles that are unique and a number of tiles that have also been presented to one or more of the other users.

In another embodiment, the system may present the user(s) with a number of pre-selected tiles, and may also allow the users to supplement the pre-selected tiles with newly-created tiles using new content, as described herein. In yet another embodiment, the system may present the user(s) with a number of pre-selected tiles, and may allow each of the users to purchase additional tiles for a fee. In either of the above-mentioned embodiments, the system may store the content within the newly created and/or purchased tiles in the semantic knowledge base and may utilize the semantic reasoner to discern the relationship between the content of the newly created and/or purchased tiles with the content of the other tiles being used for the game, as well as content within the semantic knowledge base that is not currently being used for a game.

The tiles and/or content may be presented to the user(s) based upon the type of gameplay desired. Users may be tasked with the same activities during gameplay, or may be assigned certain roles within the gameplay (e.g., one user rearranges tiles while another creates content) to play cooperatively or competitively. Examples of the type of gameplay may include, but are not limited to: (1) a single user against artificial intelligence or multiple users playing head-to-head, wherein each user takes a turn presenting one or more tiles that correspond to tiles already displayed in a gameplay screen or forming new connections between already present corresponding tiles; (2) a single user presents one or more tiles that correspond to tiles already displayed in the gameplay screen or forms new connections between already present corresponding tiles; (3) user(s) tapping pairs/groups of corresponding tiles to eliminate them from the gameplay screen; (4) user(s) rearranging a "jumble" of tiles in a corresponding manner; (5) user(s) completing a word search; (6) user(s) completing a "flying tiles" task wherein the tiles dynamically change and/or move around the gameplay screen, thus requiring a user to "grab" corresponding tiles and put them together; (7) user(s) buying, selling, gifting or trading a number of tiles to create a "patchwork quilt," which may be purchased as an actual physical object; and (8) completing a task of counting tiles. Any of the above games may additionally have a set of gameplay options, such as timed games, points awarded based upon quality/quantity of relationships between corresponding tiles, speed and/or accuracy and the like. The types of gameplay presented herein are merely illustrative, and thus other types of gameplay not specifically described are also included without departing from the scope of the present disclosure.

Once tiles are presented to the user(s), the system may receive 535 any number of inputs from the user(s). Examples of such inputs may include, but are not limited to, presenting one or more tiles to the gameplay screen to start or resume a game, placing corresponding tiles adjacent each other, tracing connection lines between corresponding tiles, tapping corresponding tiles to make them disappear, rearranging tiles, creating new tiles with new content, purchasing new tiles with new content and/or the like.

In various embodiments, the system may determine 540 whether the inputs received from the user, with respect to matching corresponding contents of tiles, match the relationships previously recorded in the semantic knowledge base. In some embodiments, the system may provide a notification to the user. The notification is not limited by this disclosure any may include, for example, a notification of a correct match, a notification of an incorrect match, a notification of a probability of a correct or incorrect match, a notification of a weighted correct or incorrect match, and/or the like. While no means limiting, the system notifications with respect to correct or incorrect matches will be discussed in greater detail below.

In various embodiments, the system may notify 545 the user of an incorrect match if a match is not found between the user's inputs and the previously recorded information in the semantic knowledge base. The system may further notify 545 the user of a probability of no match being found, a weighted no-match, and/or the like, as described herein. In some embodiments, the system may receive 535 additional inputs from the user(s). In some embodiments, the system may present the user with an option to override the perceived no-match by providing a description for how a number of tiles correspond to each other, and save the description to the semantic knowledge base for future reference. In some embodiments, the system may present other users with an option to vote, provide feedback and/or the like with regards to the perceived no-match, and the other users may decide, either collectively or individually, whether the tiles correspond to each other. Thus, as the number of games and entries from users increases, the semantic knowledge base may become more robust and capable of finding relationships between corresponding contents that formerly were not stored.

In various embodiments, if a correct match is found between the user's inputs and the previously recorded information in the semantic knowledge base, the system may indicate 550 such a match to the user(s) and may further complete other tasks such as assigning points and the like. As previously described herein, the system may indicate 550 that a match has a probability of being correct, that the match is weighted, and/or the like. The system may determine 555 whether all of the tiles have been used and/or corresponding contents have been found in the gameplay screen. If they have, the system may direct the game to end and may further complete any end-of-game tasks such as computing scores, determining a winner, saving data to the semantic knowledge base and/or other database and the like. If all of the tiles have not been used and/or corresponding contents have not been found, the system may receive 535 additional inputs from the user(s).

As previously mentioned, user data, data collected from activities presented herein and data stored within the semantic knowledge base may be used for purposes such as data mining and information retrieval, analytic gathering for advertising content customization recommendations systems, constructing search algorithms, bundled searching, constructing targeted newsfeed delivery, constructing networks and/or the like. For example, the data collected and stored as described herein may be used to define customized web-based searches; a user may type in a keyword, and the search provider, armed with the information obtained herein may be able to offer additional keyword suggestions that correspond to the keyword provided by the user.

Data may further be used to provide surveys or obtain feedback from users in a manner that may be entertaining or interesting to the user. Surveys and feedback may be integrated as a portion of the gameplay or may be separate from the gameplay.

Data may also be used for purposes of analytics. Analytic data may be provided to the user such as in the form of gameplay statistics or a user's score, or may be used to discern traits about a particular user. For example, analytics may be used for discerning psychological traits about users, providing targeted advertising, and/or the like.

Figure 6:
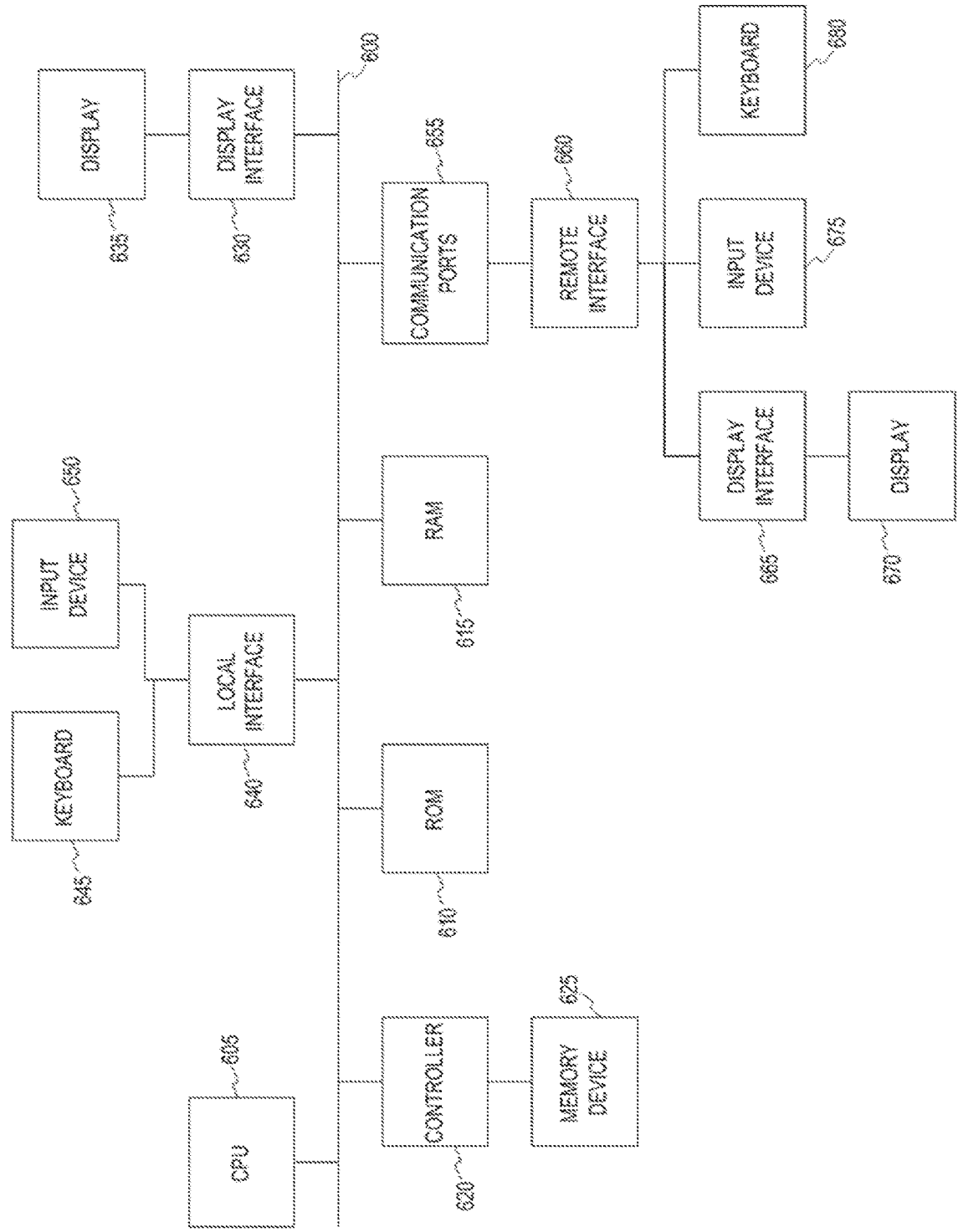
FIG. 6 depicts a block diagram of illustrative internal hardware that may be used to contain or implement program instructions according to an embodiment of the present disclosure.

FIG. 6 depicts a block diagram of illustrative internal hardware that may be used to contain or implement program instructions, such as the process steps discussed above in reference to FIG. 2, according to embodiments. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an illustrative processing device, computing device or processor as such terms are used within this disclosure. Read only memory (ROM) 610 and random access memory (RAM) 615 constitute illustrative memory devices (i.e., processor-readable non-transitory storage media).

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-Ray™ disc, and/or other non-transitory storage media.

An optional display interface 630 may permit information from the bus 600 to be displayed on the display 635 in audio, visual, graphic or alphanumeric format.

Communication with external devices, particularly the users of a computer program as described herein, may occur using various communication ports 655. An illustrative communication port 655 may be attached to a communications network, such as the Internet or an intranet. The communication ports 655 may further be attached to a remote interface 660 that allows the receipt of data from input devices such as a keyboard 680 or other input device 675 such as a mouse, a joystick, a touch screen, a remote control, a pointing device, a video input device and/or an audio input device. The remote interface 660 may further be configured to transmit display information to a second display interface 665, which may permit that information to be displayed on a second display 670 in audio, visual, graphic or alphanumeric format.

The hardware may also include a local interface 640 which allows for receipt of data from input devices such as a keyboard 645 or other input device 650 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system comprising:
   a semantic knowledge base comprising information regarding one or more stored relationships between a plurality of units;
   a processor; and
   a non-transitory, processor-readable storage medium in communication with the processor, wherein the non-transitory, processor-readable storage medium comprises one or more programming instructions that, when executed, cause the processor to:
   format a portion of the plurality of units as tiles, wherein each tile represents a unit;
   direct a display to present the tiles to one or more users;
   receive an input, comprising a manipulation of at least one tile, from at least one of the one or more users, wherein the input corresponds to a determination of a relationship between one or more first units of the portion of the plurality of units and at least one of one or more first units and one or more second units based on a content of each unit, wherein the second units are supplied by the at least one of the one or more users;
   compare the input with the information in the semantic knowledge base;
   determine whether the input corresponds to a stored relationship;
   responsive to a determination that the input does correspond to a stored relationship, modify the stored relationship based on the input; and
   responsive to a determination that the input does not correspond to a stored relationship, store the relationship in the semantic knowledge base.

2. The system of claim 1, wherein the non-transitory, processor-readable storage medium further comprises one or more programming instructions that, when executed, cause the processor to:
   present one or more queries to the one or more users;
   receive one or more responses to each of the one or more queries; and
   based on the one or more responses, select a plurality of the units.

3. The system of claim 1, wherein the non-transitory, processor-readable storage medium further comprises one or more programming instructions that, when executed, cause the processor to:
   present a voting request to the one or more users;
   receive, from at least one of the one or more users, a voting response, wherein the voting response confirms the input contains a valid relationship or denies the input contains a valid relationship; and update the semantic knowledge base with new information regarding the relationship between the plurality of units from the input based on the voting response.

4. The system of claim 1, wherein directing the display to present the plurality of units to one or more users further comprises one or more programming instructions that, when executed, cause the processor to direct the display to present, to each of the one or more users, a portion of the plurality of units.

5. The system of claim 1, wherein directing the display to present the plurality of units to one or more users further comprises one or more programming instructions that, when executed, cause the processor to direct the display to present the plurality of units to the one or more users based on one or more preferences selected by the user.

6. The system of claim 1, wherein the non-transitory, processor-readable storage medium further comprises one or more programming instructions that, when executed, cause the processor to weight the relationship.

7. The system of claim 1, wherein the content of each of the plurality of units comprises one or more of mined data, analyzed data, a keyword, a key phrase, user-generated content, free content, paid content, redeemable content, content obtained from internet sources, content obtained from non-internet sources, a number, a letter, a phrase, a sentence, a video clip, an audio clip, a clip art image, a photograph, an animation, a nested game, an exercise, an activity and an advertisement.

8. The system of claim 1, wherein the non-transitory, processor-readable storage medium further comprises one or more programming instructions that, when executed, cause the processor to:
   receive an input from at least one of the one or more users, wherein the input corresponds to a user determined connection strength of one or more stored relationships between the plurality of units;
   adjust the connection strength of the one or more stored relationships based on the user determined connection strength; and,
   store the adjusted connection strength in the semantic knowledge base.

9. The system of claim 1, wherein the non-transitory, processor-readable storage medium further comprises one or more programming instructions that, when executed, cause the processor to provide a notification to the one or more users.

10. The system of claim 1, further comprising communicating between the updated semantic knowledge and at least one of an information retrieval system, a content customization system, and recommendation system.

11. The system of claim 1, wherein each of the one or more first units and the one or more second units comprise one or more distinct sets, wherein each set contains a connected graph.

12. The system of claim 1, wherein the determined relationship comprises at least one of a supportive association, a associative association, a corresponding association, an antagonistic association, a successive association, a partnership association, and a meta association.

13. The system of claim 1, wherein the non-transitory, processor-readable storage medium further comprises one or more programming instructions that, when executed, cause the processor to:
   receive input from the at least one of the one or more users configured to transfer at least a portion of a tile, wherein transferring comprises at least one of: purchasing, selling, gifting, or trading the portion of the tile.

14. A method of determining one or more relationships between a plurality of units, the method comprising:
   formatting a portion of the plurality of units as tiles, wherein each tile represents a unit presenting, by a processor, the tiles to one or more users;
   receiving, by the processor, an input, comprising a manipulation of at least one tile, from at least one of the one or more users, wherein the input corresponds to a determination of a relationship between one or more first units of the portion of the plurality of units and at least one of one or more first units and one or more second units based on a content of each unit, wherein the second units are supplied by the at least one of the one or more users;
   comparing, by the processor, the input with the information in a semantic knowledge base;
   determining, by the processor, whether the input corresponds to a stored relationship;
   responsive to determining the input does correspond to a stored relationship, modifying the stored relationship based on the input; and
   responsive to determining the input does not correspond to a stored relationship, storing the relationship in the semantic knowledge base.

15. The method of claim 14, further comprising:
   presenting, by the processor, one or more queries to the one or more users;
   receiving, by the processor, one or more responses to each of the one or more queries; and
   based on the one or more responses, selecting, by the processor, a plurality of the units.

16. The method of claim 14, further comprising:
   presenting, by the processor, a voting request to the one or more users;
   receiving, by the processor from at least one of the one or more users, a voting response, wherein the voting response confirms the input contains a valid relationship or denies the input contains a valid relationship; and
   updating, by the processor, the semantic knowledge base with new information regarding the relationship between the plurality of units from the input based on the voting response.

17. The method of claim 14, wherein presenting, by the processor, the plurality of units to the one or more users comprises presenting to each of the one or more users, by the processor, a portion of the plurality of units.

18. The method of claim 14, wherein presenting, by the processor, the plurality of units to the one or more users comprises presenting the plurality of units to the one or more users based on one or more preferences selected by the user.

19. The method of claim 14, further comprising weighting, by the processor, the relationship.

20. The method of claim 14, wherein the content of each of the plurality of units comprises one or more of mined data, analyzed data, a key word, a key phrase, user-generated content, free content, paid content, redeemable content, content obtained from internet sources, content obtained from non-internet sources, a number, a letter, a phrase, a sentence, a video clip, an audio clip, a clip art image, a photograph, an animation, a nested game, an exercise, an activity and an advertisement.

21. The method of claim 14, further comprising:
   receiving, by the processor, an input from at least one of the one or more users, wherein the input corresponds to a user determined connection strength of one or more stored relationships between the plurality of units;

adjusting, by the processor, the connection strength of the one or more stored relationships based on the user determined connection strength; and storing, by the processor, the adjusted connection strength in the semantic knowledge base.

22. The method of claim 14, further comprising providing, by the processor, a notification to the one or more users.

23. The method of claim 14, further comprising communicating between the updated semantic knowledge and at least one of an information retrieval system, a content customization system, and recommendation system.

24. The method of claim 14, wherein each of the one or more first units and the one or more second units comprise one or more distinct sets, wherein each set contains a connected graph.

25. The method of claim 14, wherein the determined relationship comprises at least one of a supportive association, a associative association, a corresponding association, an antagonistic association, a successive association, a partnership association, and a meta association.

26. The method of claim 14, further comprising receiving input from the at least one of the one or more users configured to transfer at least a portion of a tile, wherein transferring comprises at least one of: purchasing, selling, gifting, or trading the portion of the tile.

27. A method comprising:
formatting a portion of a plurality of units as tiles, wherein each tile represents a unit;
directing, by a processor, a display to present the tiles to one or more users;
receiving, by the processor, an input, comprising a manipulation of at least one tile, from at least one of the one or more users, wherein the input corresponds to a user determined connection strength of the one or more stored relationships between the plurality of units;
adjusting, by the processor, the connection strength of the one or more stored relationships based on the user determined connection strength; and
storing, by the processor, the adjusted connection strength in the semantic knowledge base.

28. The method of claim 27, further comprising providing, by the processor, a notification to the one or more users.

29. The method of claim 27, further comprising:
presenting, by the processor, one or more queries to the one or more users;
receiving, by the processor, one or more responses to each of the one or more queries; and
based on the one or more responses, selecting, by the processor, a plurality of units.

30. The method of claim 27, further comprising:
presenting, by the processor, a voting request to the one or more users;
receiving, by the processor, from at least one of the one or more users, a voting response, wherein the voting response confirms the input contains a valid relationship or denies the input contains a valid relationship; and
updating, by the processor, the semantic knowledge base with new information regarding the relationship between the plurality of units from the input based on the voting response.

31. The method of claim 27, wherein directing the display to present the plurality of units to one or more users further comprises directing, by the processor, the display to present, to each of the one or more users, a portion of the plurality of units.

32. The method of claim 27, wherein directing the display to present the plurality of units to one or more users further comprises directing, by the processor, the display to present the plurality of units to the one or more users based on one or more preferences selected by the user.

33. The method of claim 27, further comprising weighting, by the processor, the relationship.

34. The method of claim 27, wherein the content of each of the plurality of units comprises one or more of mined data, analyzed data, a keyword, a key phrase, user-generated content, free content, paid content, redeemable content, content obtained from internet sources, content obtained from non-internet sources, a number, a letter, a phrase, a sentence, a video clip, an audio clip, a clip art image, a photograph, an animation, a nested game, an exercise, an activity and an advertisement.

35. The method of claim 27, further comprising communicating between the updated semantic knowledge and at least one of an information retrieval system, a content customization system, and recommendation system.

36. The method of claim 27, wherein each of the one or more first units and the one or more second units comprise one or more distinct sets, wherein each set contains a connected graph.

37. The method of claim 27, wherein the determined relationship comprises at least one of a supportive association, a associative association, a corresponding association, an antagonistic association, a successive association, a partnership association, and a meta association.

38. The method of claim 27, further comprising receiving input from the at least one of the one or more users configured to transfer at least a portion of a tile, wherein transferring comprises at least one of: purchasing, selling, gifting, or trading the portion of the tile.

39. A system for evaluating one or more user's health comprising:
a semantic knowledge base comprising information regarding one or more stored relationships between a plurality of units;
a processor; and
a non-transitory, processor-readable storage medium in communication with the processor, wherein the non-transitory, processor-readable storage medium comprises one or more programming instructions that, when executed, cause the processor to:
format a portion of the plurality of units as tiles, wherein each tile represents a unit;
direct a display to present the tiles to one or more users;
receive an input, comprising a manipulation of at least one tile, from at least one of the one or more users, wherein the input corresponds to a determination of a relationship between one or more first units of the portion of the plurality of units and at least one of the one or more first units and one or more second units based on a content of each unit, wherein the second units are supplied by the at least one of the one or more users;
compare the input with the information in the semantic knowledge base;
determine whether the input corresponds to a stored relationship;
responsive to a determination that the input does not correspond to a stored relationship, store the relationship in the semantic knowledge base;
responsive to a determination that the input does correspond to a stored relationship, modify the stored relationship based on the input; and evaluate the one or more user's health based on at least one of: the user history and the determined relationship.

40. The system of claim 39, wherein the evaluation of the at least one of the one or more user's heath comprises evaluating a user's psychological condition.

41. The system of claim 39, wherein non-transitory, processor-readable storage medium further comprises one or more programming instructions that, when executed, cause the processor to:
present a voting request to the one or more users;
receive, from at least one of the one or more users, a voting response, wherein the voting response confirms the input contains a valid relationship or denies the input contains a valid relationship; and
update the semantic knowledge base with new information regarding the relationship between the plurality of units from the input based on the voting response.

42. The system of claim 39, wherein the non-transitory, processor-readable storage medium further comprises one or more programming instructions that, when executed, cause the processor to:
present one or more queries to the one or more users;
receive one or more responses to each of the one or more queries; and
based on the one or more responses, select a plurality of the units.

43. The system of claim 39, wherein the non-transitory, processor-readable storage medium further comprises one or more programming instructions that, when executed, cause the processor to direct the display to present, to each of the one or more users, a portion of the plurality of units.

44. The system of claim 39, wherein directing the display to present the plurality of units to one or more users further comprises one or more programming instructions that, when executed, cause the processor to direct the display to present the plurality of units to the one or more users based on one or more preferences selected by the user.

45. The system of claim 39, wherein the non-transitory, processor-readable storage medium further comprises one or more programming instructions that, when executed, cause the processor to weight the relationship.

46. The system of claim 39, wherein the content of each of the plurality of units comprises one or more of mined data, analyzed data, a keyword, a key phrase, user-generated content, free content, paid content, redeemable content, content obtained from internet sources, content obtained from non-internet sources, a number, a letter, a phrase, a sentence, a video clip, an audio clip, a clip art image, a photograph, an animation, a nested game, an exercise, an activity and an advertisement.

47. The system of claim 39, wherein the non-transitory, processor-readable storage medium further comprises one or more programming instructions that, when executed, cause the processor to:
receive an input from at least one of the one or more users, wherein the input corresponds to a user determined connection strength of one or more stored relationships between the plurality of units;
adjust the connection strength of the one or more stored relationships based on the user determined connection strength; and,
store the adjusted connection strength in the semantic knowledge base.

48. The system of claim 39, wherein the non-transitory, processor-readable storage medium further comprises one or more programming instructions that, when executed, cause the processor to provide a notification to the one or more users.

49. The system of claim 39, further comprising communicating between the updated semantic knowledge and at least one of an information retrieval system, a content customization system, and recommendation system.

50. The system of claim 39, wherein each of the one or more first units and the one or more second units comprise one or more distinct sets, wherein each set contains a connected graph.

51. The system of claim 39, wherein the determined relationship comprises at least one of a supportive association, a associative association, a corresponding association, an antagonistic association, a successive association, a partnership association, and a meta association.

52. The system of claim 39, wherein the non-transitory, processor-readable storage medium further comprises one or more programming instructions that, when executed, cause the processor to:
receive input from the at least one of the one or more users configured to transfer at least a portion of a tile, wherein transferring comprises at least one of: purchasing, selling, gifting, or trading the portion of the tile.

\* \* \* \* \*